Oct. 10, 1944.　　　G. W. MORK　　　2,359,778
WINCH
Filed March 13, 1942　　　3 Sheets-Sheet 1

George W. Mork.
INVENTOR.
BY Hoar & Ruhloff
ATTORNEYS

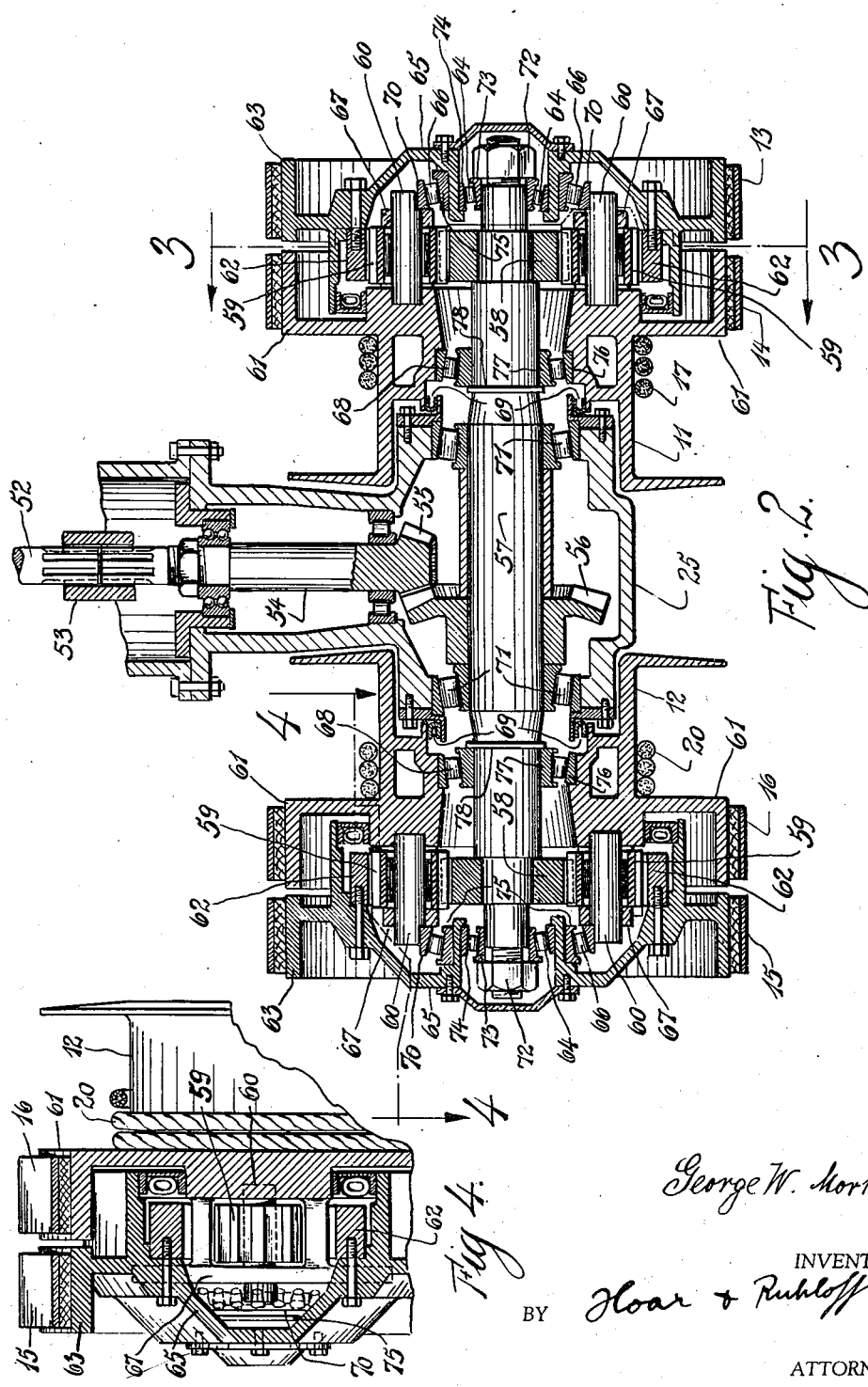

Oct. 10, 1944.  G. W. MORK  2,359,778
WINCH
Filed March 13, 1942  3 Sheets-Sheet 3
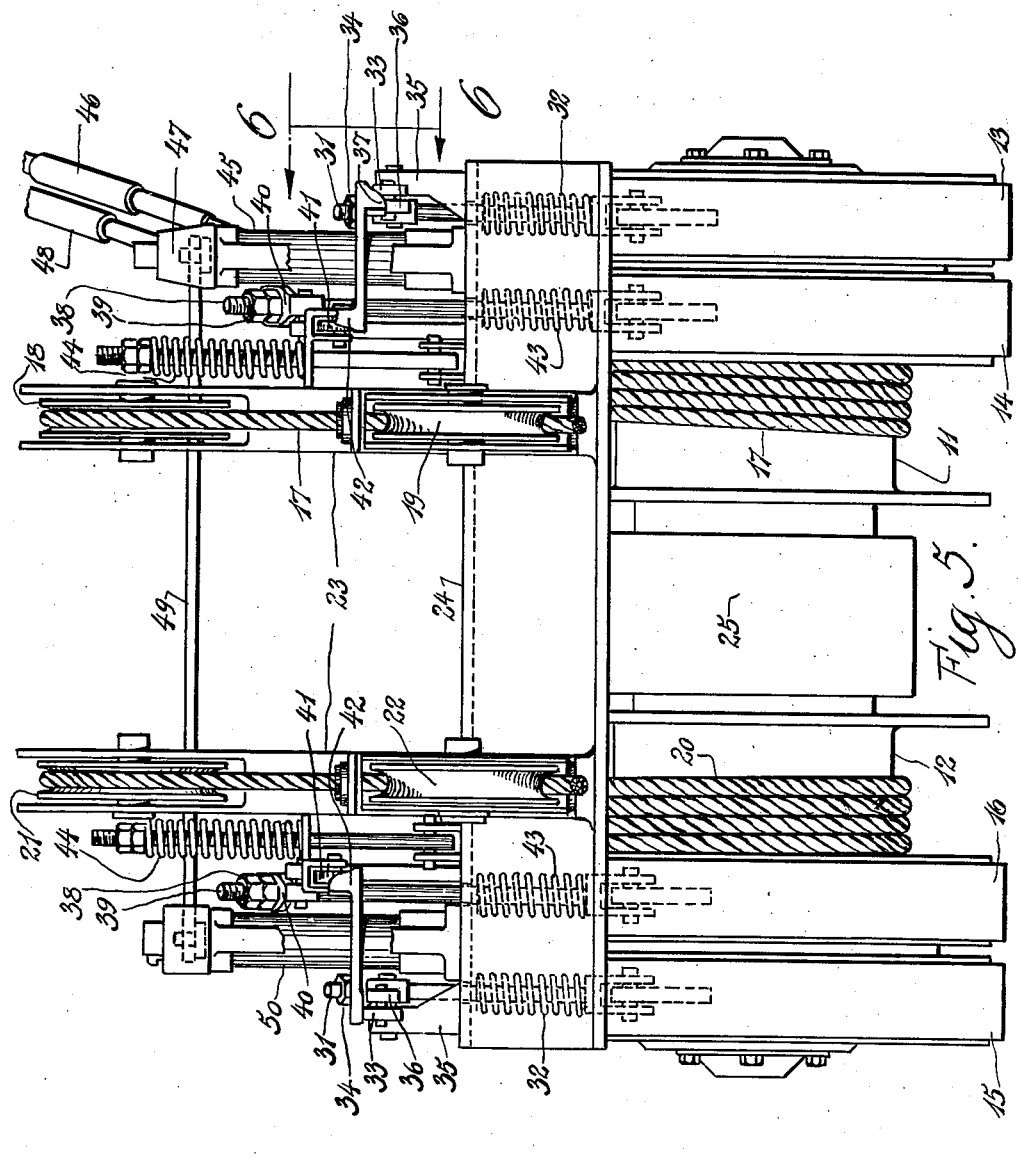
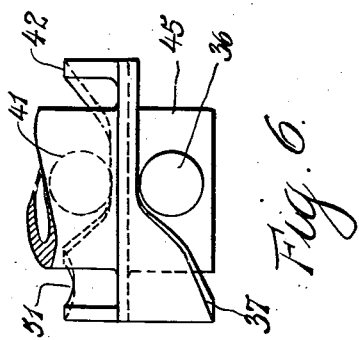
George W. Mork.
INVENTOR.
BY Hoar + Ruhloff
ATTORNEYS.

Patented Oct. 10, 1944

2,359,778

UNITED STATES PATENT OFFICE 2,359,778

WINCH

George W. Mork, South Milwaukee, Wis., assignor to Bucyrus Erie Company, South Milwaukee, Wis., a corporation of Delaware Application March 13, 1942, Serial No. 434,463

10 Claims. (Cl. 254—185)

My invention relates to new and useful improvements in planetary drives, more particularly to planetary winches intended to be attached to tractors, to be driven by the power take-off shaft of the tractor.

A principal object of my invention is to provide an improved winch with few parts and of simple compact design.

A further object of my invention is to provide a winch in which the meshing of the planetary gears is improved, and better oil sealing is effected.

A further object of my invention is to provide a winch in which the bearings are fewer in number, operate more efficiently, and are more easily adjusted.

In addition to my principal objects, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figure 2 is a plan view, partly in section, taken along the line 2—2 of Figure 1.

Figure 4 is a vertical section taken along the line 4—4 of Figure 2, and illustrating the mounting of the planetary gears on the cable drum.

Figure 5 is a rear elevation, partly broken away, taken along the line 5—5 of Figure 1, the fairleads being shown somewhat reduced in scale, in order to permit full scale showing of the inventive portions of the winch.

Figure 6 is an enlarged side elevation of the brake and clutch cam assembly of the winch, taken along the line 6—6 of Figure 4.

Figures 1, 3:
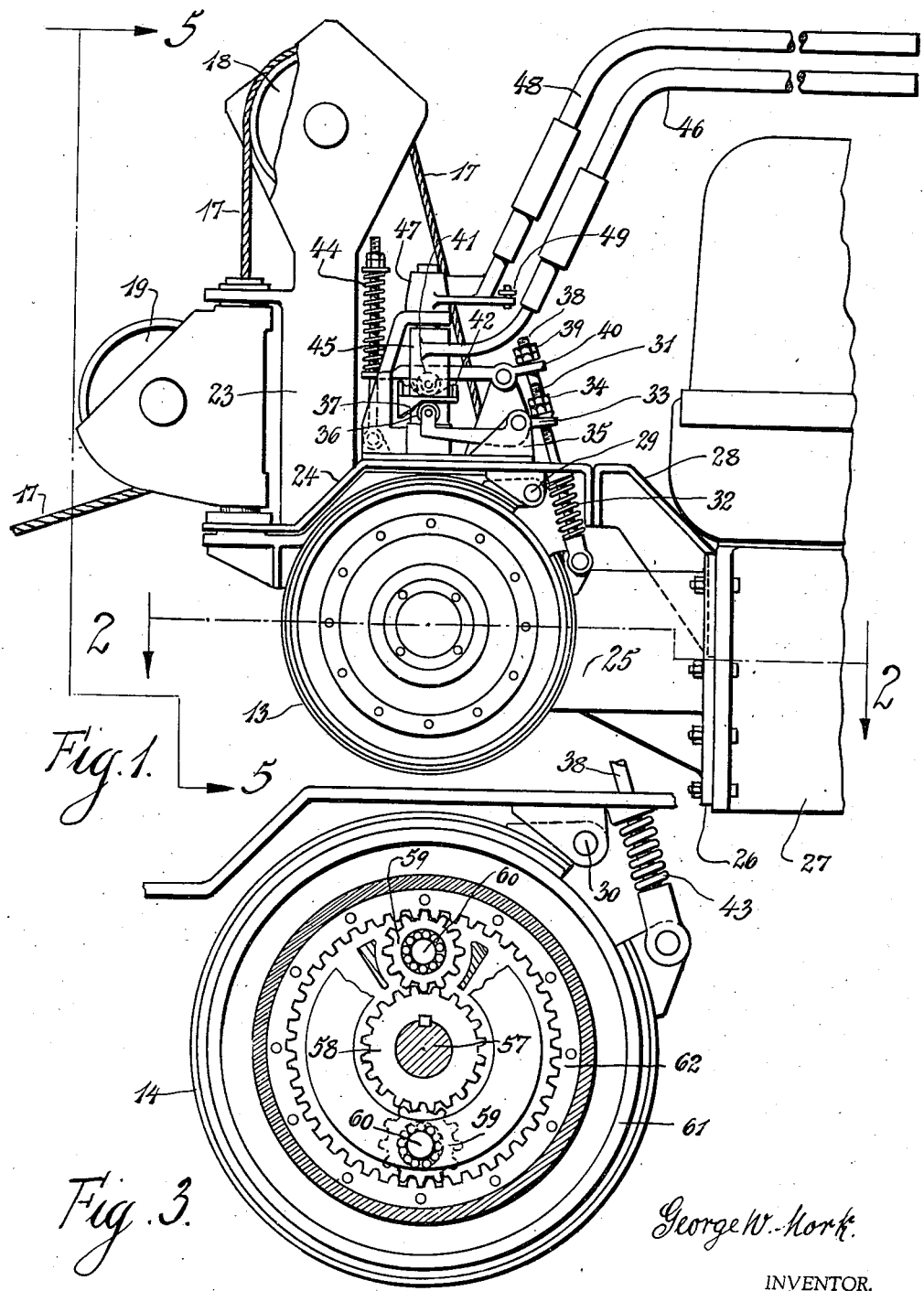
Figure 1 is a side elevation of my winch.
Figure 3 is a vertical section, taken along the line 3—3 of Figure 2, and illustrating one of the sets of planetary gears of my winch, but with these gears rotated into a vertical plane.

Turning now primarily to Figures 1 and 5, we see our winch consists primarily of two drums 11, 12, each actuated by planetary gearing. Drum 11 is controlled by clutch 13 and brake 14. Drum 12 is similarly controlled by clutch 15 and brake 16.

Rope 17 extends, from drum 11, over fairlead sheave 18, under swivelled fairlead sheave 19, and thence to the work (not shown). Rope 20 similarly extends, from drum 12, over fairlead sheave 21, under swivelled fairlead sheave 22, and thence to the work (not shown).

Fairlead sheaves 18 and 21 are mounted on two pedestals 23, which in turn are carried by the main deck-plate 24. Swivelled fairlead sheaves 19 and 22 are mounted on pedestals 23 and deck-plate 24.

The main gear case 25 has a circular flange 26 whereby the winch may be secured to the supporting structure, such, for example, as the rear transmission case 27 of the tractor. Similarly the deck-plate 24 may be secured to the tractor by means of connecting braces 28.

Each clutch and brake is actuated as will now be described as to the right hand clutch and brake.

The dead end of clutch band 13 is pivoted on a lug 29 secured as by welding to the lower side of deck-plate 24. Brake band 14, is similarly pivoted on lug 30 (see Figure 3).

The live end of clutch band 13 is pivoted on the lower end of a short rod 31, which passes upwardly through a hole in the deck-plate. Compression spring 32, bearing against the bottom of the deck-plate and the head of rod 31, tends to force the clutch band to unset. The upper end of rod 31 passes through a hole in the short end of lever 33, and carries an adjusting nut 34 which bears on this lever. The lever is pivoted on a lug 35 upstanding from deck-plate 24. The long end of the lever carries a roller 36, which bears on a cylindrical cam surface 37.

Similarly the live end of brake band 14 is pivoted on the lower end of a long rod 38, which has adjusting nut 39, bearing on lever 40, which carries roller 41, riding on cam surface 42. Spring 43 corresponds to spring 32. But this assemblage requires an additional spring 44, bearing down on lever 40 and stronger than spring 43, to set the brake whenever permitted by cam surface 42 and roller 41.

The two cam surfaces 37 and 42 are integral with cylinder 45, which in turn is rotated by control-handle 46. Pivotally mounted on the cap of cylinder 45 is cap 47, rotated by control-handle 48. By means of rod 49, cylinder 50 on the other side of the winch rotates synchronously with cap 47, and thereby controls clutch 15 and brake 16 in manner identical to the control of clutch 13 and brake 14.

The operation of the two-cam control will now be described.

As shown in Figures 1 and 6, the controls are in neutral. Rotating the cylinder 45 to the right in those figures, first brings cam surface 37 to bear on the clutch roller 36, depressing the roller, and hence (see Figure 1) raising the lever 33, thus pulling up on rod 31, and thus beginning to set clutch 13. The brake remains set, so the load will not drop, until the clutch is completely set. But, due to the nature of the brake band, it being a one-way brake, it will drag when the clutch is first set, and thus only negligibly impede the rotation of the winch drum. Further rotation of cylinder 45 to the right completely sets the clutch by completely depressing roller 36. At the same time roller 41 rides up on the cam surface 42, against the compression spring 44 (see Figure 5), thus (see Figure 1) depressing lever 40, thereby slacking-up on rod 38 (see Figure 3) and thus permitting spring 43 to unset brake 14.

This setting the clutch before releasing the brake, and thereafter releasing the brake, is in accordance with, and dominated by, Patent No. 1,563,568, issued December 1, 1925, to Hoar.

Rotation of cylinder 45 to the left in Figure 6 will not affect clutch roller 36, and thus will leave the clutch still unset, but again brake roller 41 will ride up on cam surface 42, thus releasing the brake as already described. When thus fully released, the roller 41 comes to rest in a notch 51 on cam surface 42, thus enabling the operator to let go the handle 46, and leave the brake locked unset, in spite of brake-setting spring 44.

Referring to Figure 2, I shall now describe the specially mounted planetary system, which is one of the features of my invention.

The power take-off shaft 52 is connected by a collar 53 to aligned shaft 54, which carries bevel pinion 55. This pinion drives bevel gear 56 on the driving cross-shaft 57. Cross-shaft 57 carries sun gear 58. Planet gears 59 are journalled on pins 60, which in turn are carried by brake drum 61, which is built integral with winch drum 11, to rotate on cross-shaft 57. An internal ring gear 62 is constrained to rotate with clutch drum 63 which is journalled on shaft 57 by means of anti-friction bearings 64 on the outer end of cross-shaft 57. It should be obvious that neither the brake drum 61 nor the clutch drum 63 need necessarily be annular. Accordingly when in the claims I refer to brake drums or clutch drums, I intend any braking or clutching surface.

In the conventional planetary winches of the prior art, the spider which carries the planet gear pins rotates integrally with the clutch drum, and the ring gear rotates integrally with the brake drum; whereas in my winch it is the clutch drum which is keyed to the ring gear, and the brake drum carries the planet gears. This construction permits my winch to attain the following very important advantages over winches of the prior art. (1) Clutch setting effort required to apply a given torque to the winch drum is reduced nearly one-half, without diminishing brake setting effort. (2) Tooth pressure is reduced, making it possible to use fewer and smaller planet and ring gears with fewer teeth, at a great saving in expense. (3) The connection between the clutch drum and the ring gear is direct, eliminating the awkward, expensive, and bulky planetary cage which formerly supported the planet gears and connected them with the clutch drum. (4) The separate cover for the planetry system is also eliminated, because the clutch housing 65 serves that purpose. (5) Elimination of the planetary cage and the separate cover for the planetary system has made it possible to build a winch that is laterally far more compact than the conventional winches. (6) The ring gear is now centered on the anti-friction bearings 64 which support the clutch drum and housing, instead of on the brake drum bushings as in the prior art, with the result that bearing take-up and adjustment can be easily made (as hereinafter described) to prevent wobbling, and gear meshing is improved. (7) The direct connection between the planet gears and the winch drum makes it possible to use a novel method of mounting the winch drum which I shall now describe.

In conventional winches of the prior art, it is usual to rotatably mount the winch drum on lateral extensions of the gear case 25 by means of bushings placed directly under the winch drum. At the side of the winch drum there is usually an oil seal between the drum and the gear case. In my novel construction, however, winch drum 11 is journalled by means of antifriction roller bearings on the clutch housing 65 and on the cross-shaft 57 as will now be described. The outer bearings 66 for the winch drum are located on the outer side of the planetary gearing and support the outer extension 67 of the winch drum 11, directly on the clutch housing 65 and indirectly on the cross-shaft 57, through clutch drum bearings 64. The inner bearings 68 for the winch drum are located under the inner part of the cable drum barrel and are mounted directly on the cross-shaft 57.

It will be noted that bearings 64 and bearings 66 are "substantially coplanar": i. e., they lie substantially in a common plane perpendicular to the shaft 57. Also they are "similarly oriented": i. e., the cones of both sets converge in the same direction.

The following important advantages accrue from this method of mounting the winch drum: (1) One set of cross-shaft bearings and the bushings which formerly supported the winch drum and ring gear are eliminated. The ring gear bushing is now unnecessary, because my ring gear is keyed to the clutch drum. The old winch drum bushings are now eliminated because the winch drum is now keyed to the planet gear pins 60, whose bearings accordingly support the winch. The inner bearings which formerly supported the cross-shaft 57 on the gear case are eliminated, since the bearings 71, now brought closer together for compactness, not only give good widespread support for the shaft, but at the same time prevent shaft deflection from the bevel gear load, since one of them is adjacent the bevel gear 56. (2) Oil sealing and gear meshing are improved because the winch drum and ring gear may be seated tightly in place by taking up on the bearings, and wobbling is eliminated. (3) Mounting winch drum bearings 68 under the inner part of the cable drum barrel permits a good spread for bearings 71 and also provides space under the barrel for oil seal 69 thus reducing the lateral length of the winch. (4) Mounting winch drum bearings 66 on the clutch housing 65 substantially coplanar with the bearings 64 instead of directly on the cross-shaft 57 adjacent the bearings 64, further contributes to lateral compactness by providing a widespread bearing support for clutch housing 65 formerly provided by a second set of bearings spaced along the shaft, and also makes it possible to use the inner track or cup 70 of bearings 66 to key the planetary pins 60 to the cable drum extensions 67. (5) A single-bearing adjustment suffices to tighten up the entire planetary brake-clutch assembly as will now be described.

Referring to Figure 2, we see that two sets of bearings, namely bearings 64 and 68, directly support respectively the clutch assembly and the cable drum, with its associated brake assembly, on the cross-shaft 57. A third bearing 66 supports the outer extension 67 of the cable drum and associated brake assembly indirectly on cross-shaft 57 through clutch housing 65 and bearing 64. Obviously bearing 66 equally can be regarded as supporting the clutch housing on the cable drum brake assembly, as well as vice versa, and could equally well have its inner race secured to either and its outer race secured to the other. This arrangement makes it possible to take up on all three sets of bearings by a single adjustment of the inner track or cone 73 of the clutch housing bearings 64 as follows. When nut 72 on the end of cross-shaft 57 is tightened up, it exerts inward lateral pressure against inner track or cone 73 of bearings 64, which pressure is transferred through outer track or cup 74 and clutch housing 65, to cone 75, thereby tightening bearings 66, and thence through cup 70 and cable drum extension 67 to cup 76 of bearings 68, thereby tightening up bearings 68 and causing cone 77 to be thrust against collar 78 on cross-shaft 57. Although I have chosen to initially take up bearings 64 by means of nut 72 on cross-shaft 57, it is obvious that one of the other sets of bearings might have been selected for initial take-up by appropriate tightening means, and that my invention embraces all such alternative arrangements of parts. Likewise, it is obvious that bearings 68 and stop means such as the collar 78 need not be located on the cross shaft for the proper functioning of my bearing tightening feature, and that my invention embraces other alternative arrangements for mounting the driven member or cable drum on the main housing.

Whenever in the claims I refer to a conical bearing, I shall mean generically any bearing which can be tightened by the relative longitudinal shift of the supporting and supported relatively rotatable elements.

Referring now to Figure 3, I shall describe the operation of the planetary system. Assume that shaft 57 and sun gear 58 impelled thereby are rotating clockwise, and assume that ring gear 62 is held fast from rotating, by the pressure of clutch band 13 on clutch drum 63. The clockwise rotation of sun gear 58 will then carry planet gears 59 rotating around it, each planet gear rotating counterclockwise but traveling bodily clockwise, rolling on the internal teeth of fixed ring gear 62, and carrying winch drum 11 with them, to wind up the cable.

If now, however, clutch 13 is released and brake 14 is set, brake drum 61, winch drum 11 and planet gear pins 60 are all constrained againt rotation, and the clockwise rotation of sun gear 58 will impel planet gears 59 to rotate counter-clockwise, thus rotating ring gear 62 and clutch drum 63 counter-clockwise.

If both the clutch and the brake are set simultaneously, the clockwise rotation of the brake drum will have sufficient tendency to unset the brake, against the pressure of spring 44, so that the brake will but little impede the hauling-in of rope 17 by winch drum 11.

Having now described and illustrated one form of my invention, I wish it to be understood that my invention, in many of its phases, is applicable to planetary drives in general, and is not to be limited to winches or to the specific form or arrangement of parts herein described and shown, except in so far as such limitations are specified in the appended claims.

I claim:

1. In a planetary winch, the combination of: a main housing; a drive shaft journalled in the main housing; a clutch drum having a housing supported by bearings on the end of the drive shaft; a cable drum; a brake drum associated with the cable drum; bearings supporting the cable drum on the drive shaft; bearings supporting the cable drum and the clutch housing on each other; a sun gear on the drive shaft, and constrained to rotate therewith; a ring gear carried by the clutch drum; a plurality of planet gears carried by the cable drum by means of pins and intermeshing with said sun gear and ring gear; a track of one of said sets of bearings being adjustable to tighten all of said bearings; a closure on one side of the planetary gearing formed by the clutch housing; a closure on the other side of the planetary gearing formed by the cable drum; a spring-set brake band to lock the cable drum against rotation; a spring-released clutch band for securing the clutch drum against rotation in order to drive the cable drum; and synchronized manually operated means to set the clutch and to release the brake or vice versa in order to selectively drive, release, or hold the cable drum.

2. In a planetary winch, the combination of: a main housing; a drive shaft journalled in the main housing; a clutch drum having a housing supported by bearings on the drive shaft; a cable drum; a brake drum associated with the cable drum; bearings supporting the cable drum on the drive shaft; bearings supporting the cable drum and the clutch housing on each other; a sun gear on the drive shaft, and constrained to rotate therewith; a ring gear carried by the clutch drum; a plurality of planet gears intermeshing with said sun gear and ring gears and carried by the cable drum by means of pins, said pins being keyed to the cable drum by means of a track of said third mentioned bearings, and a track of one of said sets of bearings being adjustable to tighten all of said bearings; a brake band to lock the cable drum against rotation; a clutch band for securing the clutch drum against rotation in order to drive the cable drum; and synchronized manually operated means to set the clutch and to release the brake or vice versa in order to selectively drive, release, or hold the cable drum.

3. In a planetary drive, the combination of: a drive shaft, carrying a sun gear, and constrained to rotate therewith; a driven member supported by means of a bearing for rotation about the drive shaft and carrying planet gears intermeshing with the sun gear; a brakable element carrying a ring gear intermeshing with the planet gears; a bearing to support the brakable element and the driven member on each other; a bearing to support the brakable element on the drive shaft; a plurality of said bearings being conical and so oriented that tightening one of said bearings will tighten a plurality of said bearings; and means for constraining the brakable element against rotation to drive the driven member.

4. In a planetary drive, the combination of: a drive shaft; a sun gear, carried by the drive shaft, and constrained to rotate therewith; a driven member; a planetary clutch assembly, for driving said driven member, said clutch assembly including a brakable element, planet gearing, and ring gearing, one of said gearings being carried by the brakable element, and the other of said gearings being carried by the driven member; a bearing to support the brakable element for rotation about the drive shaft; a bearing to support the driven element for rotation about the drive shaft; a bearing to support the brakable element and the driven element on each other; a plurality of said bearings being conical and so oriented that tightening one of said bearings will automatically tighten a plurality of said bearings; and means for constraining the brakable element against rotation, to drive the driven member.

5. In a winch, the combination of: a driven member and a transmission to selectively drive or release the driven member, including: a drive shaft; journal means to support the driven member for rotation about the drive shaft; a clutch assembly, including a rotatable member constituting an element thereof, said rotatable member being supported and held tightly in a plane normal to the shaft by a pair of concentric substantially coplanar conical bearings, having their cones converge in the same direction, and capable of taking both radial and axial loads; the outer of said bearings supporting the rotatable member on the driven member and having a large diameter thrust face; and the inner of said bearings supporting the rotatable member on the drive shaft.

6. In a planetary winch, the combination of: a main support; a shaft, journalled in the support for rotation and against translation in one direction; a sun gear on the shaft, and constrained to rotate therewith; a winch drum and a brake drum, constrained to rotate together; a conical bearing supporting the winch drum brake drum assembly to rotate about the shaft, and oriented to tighten if the assembly moves in the above-mentioned direction, planet gears, journalled on the winch drum brake drum assembly, and meshing with the sun gear; a brake for the brake drum; an internal ring gear and a clutch drum, constrained to rotate together, and lying in a direction opposite to the above-mentioned direction from the winch drum brake drum assembly, the ring gear engaging the planet gears; a second conical bearing, adjustable longitudinally with respect to the shaft, and supported by the shaft, and supporting the ring gear clutch drum assembly, and oriented oppositely from the first bearing; means for holding the clutch drum; and a third conical bearing, supported by one of the two assemblies, and supporting the other of the two assemblies, and appropriately oriented; whereby, by the longitudinal adjustment of the second conical bearing with respect to the shaft, a plurality of said bearings will be simultaneously tightened or loosened.

7. In a planetary drive, the combination of: a main support; a shaft, journalled in the support for rotation and against translation in one direction; a sun gear on the shaft, and constrained to rotate therewith, a driven member; a conical bearing, supporting the driven member to rotate about the shaft, and oriented to tighten if the assembly moves in the above-mentioned direction; planet gears, journalled on the driven member, and meshing with the sun gear; a clutch drum assembly, including an internal ring gear integral therewith, and lying in a direction opposite to the above-mentioned direction from the driven member, the ring gear meshing with the planet gears; a second conical bearing, supported by the shaft, and supporting the clutch drum assembly, its smaller race being shiftable longitudinally of the shaft, so that shifting this race in the first above-mentioned direction will tighten the bearing; means for holding the clutch drum; and a third conical bearing, supporting the clutch drum assembly on the driven member, and oriented to tighten if the clutch drum assembly moves in the first above-mentioned direction; whereby the inward shifting of the smaller race of the second bearing in the first above-mentioned direction will tighten a plurality of said bearings.

8. In a planetary winch, the combination of: a main support; a shaft, journalled in the support; a sun gear on the shaft, and constrained to rotate therewith; a winch drum and a brake drum, together constituting an assembly; a conical bearing, supported by the shaft, and supporting the assembly; planet gears, journalled on the assembly, and meshing with the sun gear; a brake for the brake drum; a clutch drum assembly, including an internal ring gear the ring gear meshing with the planet gears; a second conical bearing, supported by the shaft and supporting the second assembly; means for holding the clutch drum; a third conical bearing, supported by one of the assemblies, and supporting the other; and means for shifting the smaller race of one of the shaft-supported bearings with respect to the shaft; all of the bearings being so oriented that tightening of the adjustable bearing will tighten all the others.

9. In a planetary winch, the combination of: an oil-tight housing; a shaft, journalled in the housing for rotation and against translation in one direction; a sun gear on the shaft, and constrained to rotate therewith; a winch drum and a brake drum, constrained to rotate together, and together constituting an oil-tight assembly; a conical bearing supporting the winch drum brake drum assembly to rotate about the shaft, and oriented to tighten if the assembly moves in the above-mentioned direction; planet gears, journalled on the winch drum brake drum assembly, and meshing with the sun gear; a brake for the brake drum; an internal ring gear and a clutch drum, constrained to rotate together, and together constituting an oil-tight assembly, and lying in a direction opposite to the first above-mentioned direction from the winch drum brake drum assembly, the ring gear engaging the planet gears; a second conical bearing, adjustable longitudinally with respect to the shaft, and supported by the shaft, and supporting the ring gear clutch drum assembly, and oriented oppositely from the first bearing; means for holding the clutch drum; and a third conical bearing, supported by one of the two assemblies; and supporting the other of the two assemblies, and appropriately oriented; whereby, by the longitudinal adjustment of the second conical bearing with respect to the shaft, a plurality of said bearings will be simultaneously tightened or loosened; an oil seal between the first assembly and the housing; and an oil seal between the two assemblies.

10. In a planetary winch, the combination of: an oil-tight housing; a shaft, journalled in the housing; a sun gear on the shaft, and constrained to rotate therewith; a winch drum and a brake drum, together constituting an assembly; a conical bearing, supported by the shaft, and supporting the assembly; planet gears journalled on the assembly, and meshing with the sun gear; a brake for the brake drum; a clutch drum assembly, including an internal ring gear, the ring gear meshing with the planet gears; a second conical bearing, supported by the shaft and supporting the second assembly; means for holding the clutch drum; a third conical bearing, supported by one of the assemblies, and supporting the other; and means for shifting the smaller race of one of the shaft-supported bearings with respect to the shaft; all of the bearings being so oriented that tightening of the adjustable bearing will tighten all the others; an oil seal between the first assembly and the housing; and an oil seal between the two assemblies.

GEORGE W. MORK.